Figure 1:
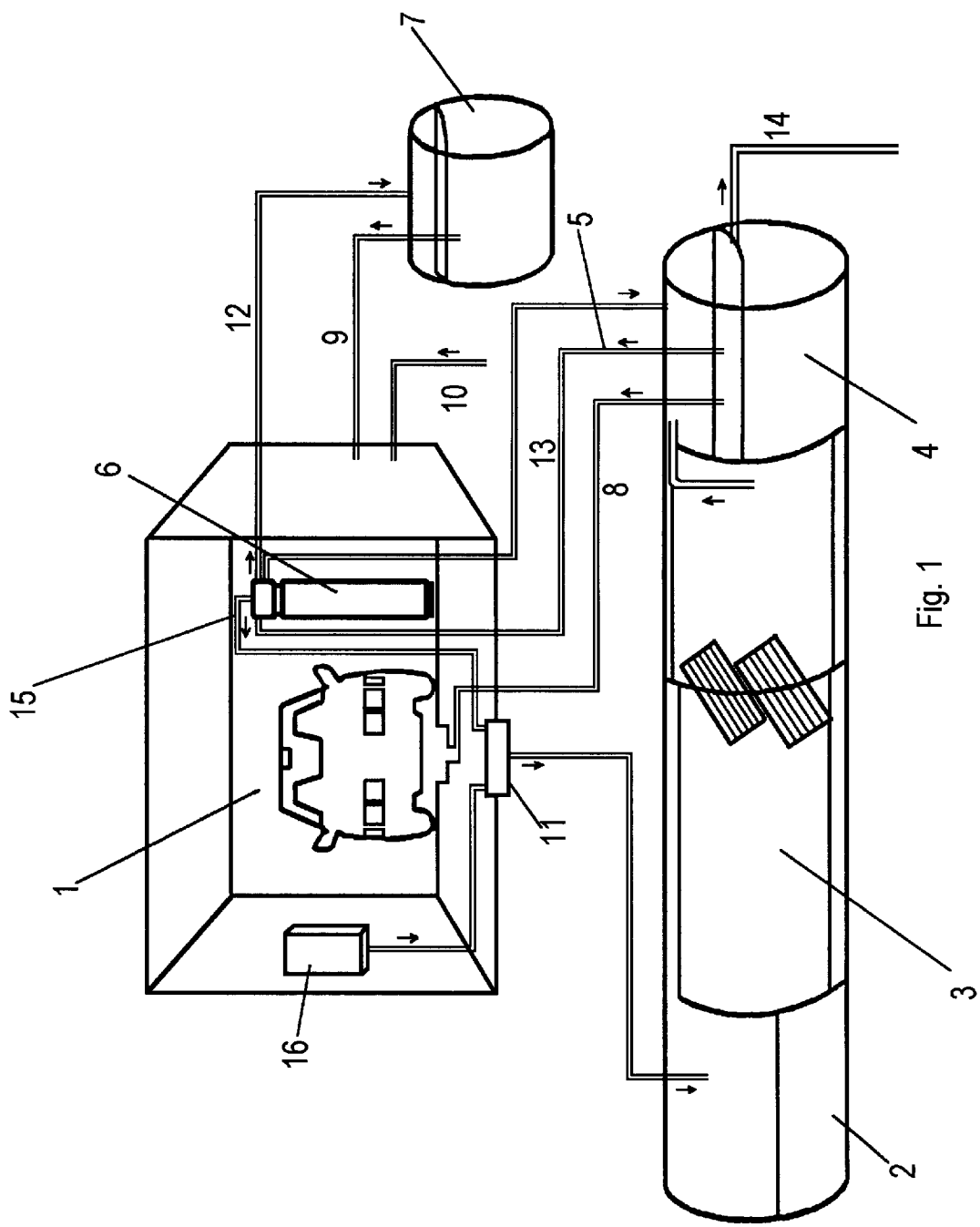

United States Patent
Eriksson

[11] Patent Number: 5,827,373
[45] Date of Patent: Oct. 27, 1998

[54] WATER-AND CHEMICAL RECYCLING

[76] Inventor: Tord Georg Eriksson, Box 167, Jäfälla, Sweden

[21] Appl. No.: 727,521
[22] PCT Filed: Apr. 28, 1995
[86] PCT No.: PCT/SE95/00477
 § 371 Date: Oct. 15, 1996
 § 102(e) Date: Oct. 15, 1996
[87] PCT Pub. No.: WO95/29877
 PCT Pub. Date: Nov. 9, 1995

[30] Foreign Application Priority Data

Apr. 28, 1994 [SE] Sweden .................................. 9401461

[51] Int. Cl.$^6$ .............................. B08B 7/04; B01D 12/00
[52] U.S. Cl. ............................ 134/10; 210/221; 210/522
[58] Field of Search .............................. 134/10; 210/221, 210/522

[56] References Cited

U.S. PATENT DOCUMENTS

Re. 30,793  11/1981  Dunkers .................................. 210/522
4,144,170   3/1979  Dunkers .................................. 210/522
4,820,450   4/1989  Wile et al. .............................. 252/545

FOREIGN PATENT DOCUMENTS

| | | |
|---|---|---|
| 0003146 | 7/1979 | European Pat. Off. . |
| 0 557 364 | 9/1993 | European Pat. Off. . |
| 401669 | 5/1978 | Sweden . |
| 9003351 | 5/1991 | Sweden . |
| 90 02608 | 2/1992 | Sweden . |
| 90 03599 | 5/1992 | Sweden . |
| 9101290 | 10/1992 | Sweden . |
| 9201428 | 11/1993 | Sweden . |
| WO 92/02665 | 2/1992 | WIPO . |
| WO 93/22242 | 11/1993 | WIPO . |

Primary Examiner—Kriellion S. Morgan
Attorney, Agent, or Firm—Pennie & Edmonds LLP

[57] ABSTRACT

Process and equipment for partial but substantial closing of the water and chemical cycle at, inter alia, automatic automobile washing machines. The wash water, which, when used, becomes loaded with oil and heavy metals and contains tensides, completing agents and possibly solvents, is treated by adding breaking and precipitating chemicals, sedimentation and filtration. The main part of the water and chemicals can be reused. Fresh water is needed for the final rinsing only.

16 Claims, 1 Drawing Sheet

WATER-AND CHEMICAL RECYCLING

BACKGROUND

Discharge from automobile washing has been and is a big environment problem. This is especially true of automatic automobile washing machines.

Beside the obvious action, to change the composition of the detergents and make them more environmentally tolerable, advanced technics such as micro-flotation, membrane filtration and biological beds have been proposed. See IVL-report A92192A, 1992 11 27! Pilot plants have been built and the results have at least in part been very good. However, the costs of these pilot plants have been too high to make a more common use of those methods possible. Those methods also imply that valuable detergent chemicals cannot be re-used but have to be disposed of or destructed as environmentally dangerous wastes. Economic incentive to maintain optimal functioning of these plants is also lacking.

The inventor has already tested a cheap and uncomplicated method, where emulsion breaking and precipitation of heavy metals in the existing oil separators have been fundamental themes. See Swedish patent no 9201428-1! Here too the results have been good. In this case the cost picture is completely different from that of those high tech solutions mentioned above. However, here too the possibilities of direct reuse of the wash solution are very limited. The high content of oil and suspended material make reuse, for anything other than washing of automobile chassis, impossible.

It has been found that even if breaking and precipitation often function well it may happen that the agglomerates formed become so small that the limited time available in a standard size oil separator is insufficient for a satisfactory separation of oil and heavy metals. See Fakta om Avloppsvatten från Biltvättar, Stockholm Vatten, Ragnsells, Shell, July 1993! The point of view of sewage treatment people is that safeguards are needed to secure that breaking and precipitation are functioning under all circumstances. In the above mentioned report filtration is proposed to reduce discharge and establish increased security.

To the chemist it is well known that filtration of metal sulphide and metal hydroxide precipitates is problematic due to their high water content and colloidal state. The problems become still worse when tensides and emulsified oils are present. Chemical emulsion breakers usually bind the filter media together and make cleaning by back flushing impossible.

The inventor has taken on the task of further developement of the breaking and precipitation system and adapting it to reuse of the wash water for the entire wash process, i.e also for the cleaning of paint, bright metal and glass surfaces, in short the entire automobile. The new system has been tested and is showing even better results than expected. The results can be summarized as follows:

1. Safeguarded quality of outgoing water i.e. equally low or lower content of contaminates than in earlier common processes,
2. Possibility of recycling the main (above 80%) part of the wash water with corresponding reduction of the waste water that must be handled,
3. Reuse of wash chemicals and thus reduced consumption,
4. Equal or better wash result,
5. A cost level that makes possible installation even for relatively small washing machines, especially as the reduction of the water and chemical consumption is so large that the investment pays for itself quickly,
6. Opportunity for the complete closing of the wash water cycle.
7. Hazardous discharges to sewage per wash are reduced more than 90%.

Recycled water can be used for the entire wash process with the exception of a final rinsing made with fresh water.

The invention exhibits a row of characteristics that have not earlier been possible to combine into a cohesive system. The effect of the system in full is substantially greater than what could be expected with respect to the known effects of the components.

Rapid separation of oils and suspended material is facilitated by adjustment between the detergents and the breaking and precipitating agents. The beat results have been obtained with detergents as in the Swedish patents no 9002608-9 and 9003599-9, which contain cationic tenside, and ortophosphate based breaking and precipitating agent by the Swedish patents no 9101290-6 and 9201428-1. But other tenside mixtures and breaking and precipitating agents may be used too. The tenside mixture should contain at lest a certain fraction of cationic tenside and the breaking and precipitating agent should be inorganic and multivalently anionic, i.e. that the anions should have at least two negative charges.

The present invention concerns a process for the regeneration and reusing of wash water containing oil, tensides and heavy metals. The wash water is partially purified by addition of breaking and precipitation chemicals, sedimentation (preferably in a gravitation based sludge/oil separator (3), which may be amplified with a lamellae separator) and filtration and then reused for a new wash cycle that can be performed with a very small addition of detergent to compensate the losses.

A preferred component of the invention is that the wash water between the steps of purifying by sedimentation and filtration is aerated or in some other way oxygenated and agitated without high shearing forces. In that way the risks of developement of ill-smelling sulphur compounds are avoided.

It has quite unexpectedly been discovered that aeration substantially decreases micro toxicity and nitrification retardation in the wash water. Aeration gives a mild agitation causing small aggregates gathering together to form agglomerates with lower water content and contributes to elimination of smell problems. To a man of the art it is obvious that the same effect may be obtained by, for instance, oxygenation and mild mechanical agitation. This is, however, more complicated and thus a less preferred procedure.

The invention also includes a system for the purifying and reuse of wash water containing tensides, oils and heavy metals. The system comprises, besides the washing machine itself, a gravitation based separator for oil and sludge, an aeration tank for the outflow from the sludge/oil separator, a circulation pump for the wash water and a filter (with the possibility of back flushing) for the aerated wash water and possibly a storage tank, which also serves as pump tank for purified wash water to the washing machine together with required pipes and valves. In the absence of a storage tank the system may be designed with the recycle tank serving as storage and pump tank.

If the units that are able to perform some of the functions of the system above are already present in a plant or automobile washing facility the invention concerns required additions.

Precipitation of heavy metals requires a relatively high and constant pH, preferably within the range 9.0 to 11.5 or more preferred between 9.5 and 10.5. Thus the wash water should be kept alkaline and preferably be buffered. Separation of emulsified oil requires as a rule addition of breaking chemicals. Both breaking and precipitation are facilitated to a great extent by the use of the breaking and precipitating chemicals of the Swedish patents 9101290-6 and 9201428-1, but other inorganic breaking and precipitating agents containing anions with valences of two or more are useful.

The system of the invention comprises dosage equipment for the breaking and precipitation chemicals and a control system adapting the dosage to what is required. pH-meters are less suitable for this purpose. Instead conductivity measuring is preferred. After calibration and adjustment to each separate plant such equipment has been found to be very reliable. In a system with recycling wash water multivalent, non-complexing anions have a number of tasks besides emulsion breaking. For instances it may be mentioned that they:

a. act as softeners and eliminate calcium and other multivalent metals, including heavy metals, by precipitation and reduce the need for addition of complexing agents, b. are corrosion inhibiting and reduce the release of heavy metals from the automobiles, c. act as buffers and give, due to their multivalence, high ionic strength that reinforces the detergency effect of the tensides.

The gravitation based separator is preferably a conventional oil separator, possibly with an added lamellae system. The aeration tank for the sludge/oil separator outflow may be part of the sludge/oil separator or a separate tank. Integration with the sludge/oil separator is preferred for practical reasons. The recycle chamber that usually is present at newer oil separators is suitable as an aeration tank. Gas stations have as a rule pressurized air equipment and the additions to accomplish aeration are thus limited to pipes and distribution devices for pressurized air in the tank.

Additions needed to an existing plant beside the above mentioned air distributor are just pump and filter—possibly together with storage tank for purified water—and the necessary valves and pipes. Plants of this kind sometimes have a buffer tank for wash water to equalize the flow from the water supply. Such a buffer tank may with advantage be used. As mentioned, designs using the recycling chamber of the sludge/oil separator as storage and pump tank are possible too.

The filter should be designed for back flushing or be equipped with other means for automatic transport for separated material to the sludge tank and the sludge/oil separator. Filters with filter media are preferred. The filter media may consist of zeolites with ion exchange capacity or filter sand. Mixed filter media may also be used.

Most conventional breaking and precipitation chemicals consist of polymers that tend to make the precipitations impossible to filter. Instead the main part of the breaking and precipitation chemicals should consist of inorganic salts. The mentioned inorganic compositions may be assisted by small quantities of polymers.

While running the system one ought to let the circulation through the filter operate even when no washing is going on. In this way a substantially better purification is obtained as compared to where the filtration is limited to the time needed to fill, or respectively keep the level constant in the storage tank. By suitable design of the system, circulation through the sludge/oil separator can be maintained during periods with no or insignificant wash frequency too. This is essential to eliminate slime formation and the generation of unpleasant smells during the hot season. In the preferred situation pump circulation is going on day and night, with the exception of the time needed for back flushing.

In a preferred example of the invention filtered water is used for back flushing. The back flushing water is channeled to the sludge/oil separator, preferably via the catch channel and the sand trap. By the use of reused water and the return of separated material, the fresh water consumption is reduced and problems with the handling of the separated material avoided. The system is in this uncomplicated way adapted to the common routines of draining oil separators at washing plants. Back flushing should as far as possible be made at times with low load on the sludge/oil separator to give plenty of time for sludge settling. For this reason back flushing during the night is preferred.

Calculated on the weight of dry substance the system according to the invention gives larger quantities of separated sludge and separated oil. At the same time the new system makes the sludge packing more effective. The draining intervals can be prolonged and the costs of sludge handling reduced.

FIG. 1 is a flow scheme for a pilot plant built according to the invention.

In the figure (1) is a washing machine consisting of a movable brush rack for the cleaning of the body and a high pressure flow rack for the cleaning of the chassi. (2) stands for a sand trap, (3) for a sludge/oil separator proper and (4) for a recycle chamber. Those units are in the pilot plant combined into one unit called sludge/oil separator. Where space allows this is a preferred design. In the pilot plant the sludge/oil separator has been amplified with a lamellae package. For small sludge/oil separators this is a preferred design. In heavily over-dimensioned sludge/oil separators, which sometimes may be found, the need for a lamellae separator is less. (5) is a pump provided conduit for dirty water from the sludge/oil separator to a filter (6), from the filter the filtered water is channeled via the conduit (12) to the storage tank (7) or if the storage tank is full via the conduit (13) to the recycle chamber (4). At back flushing the water is channeled (via a conduit not shown) from the storage tank (7) to the filter (6). After the filter the back flushing water is channeled to the catch channel in the washing room (1) via the conduit (15). The filter used in the pilot plant has a special set of valves for reversing the flow direction and time control of the back flushing. These details have been deleted from the flow scheme. It is of course within the scope of the invention to use different pumps for filtration and back flushing as well as using the pressure in the water conduit system for back flushing with fresh water.

(8) is a conduit provided with a high pressure pump for cleaning the chassis of the automobiles, (9) is a pump provided conduit supplying the washing machine with wash water. (16) is a dosage device for breaking and precipitating chemicals, (14) a conduit for the surplus of waste water caused by the addition of fresh water for the final rinsing.

The scheme in FIG. 1 should not be interpreted as limiting the invention. A man of the art may easily find other good technical solutions that provide for the themes of the invention.

Further it should be understood that the usefulness of the system is not limited to brush washing machines. With the adjustments that follow the washing method the invention can be used for wash water from high pressure washing machines, washing machines for heavy vehicles and wash water with comparable composition from manufacturing etc.

A decisive advantage with this invention system is that both water and wash chemicals are reused. Thus one may maintain a substantially higher concentration in the washing solution than otherwise would be possible from an economic standpoint. This gives a considerably better wash result.

In the IVL-report mentioned above misgivings are put forward that closing the cycle as described above would give too high concentrations of salt in the washing solution and lead to corrosion and salt staining of the surfaces being washed. This is an expression of a common prejudice within the branch. The inventor has broken through this prejudice and shown that high salt concentration in the wash water can be an advantage with respect to the efficiency of the washing.

A very distinct difference between earlier efforts and the inventor's way of approaching the problem is that in earlier systems most tried to separate water and wash chemicals, to the extreme, making the wash water drinkable, while he has concentrated himself upon the more earthly, but more difficult, task of regenerating wash water and chemicals to the level needed for new washings.

I claim:

1. A process for regenerating a used washing solution for motorized vehicles, said process comprising:
    (a) generating a used washing solution comprising a detergent containing cationic tensides and a sludge comprising at least one of an oil, a heavy metal, and particulate matter;
    (b) adding to said used washing solution a quantity of an emulsion breaking and heavy metal precipitating agent, said agent comprising a multivalently anionic soluble salt, to form a treated washing solution;
    (c) separating at least a portion of the sludge from the treated solution, thereby forming an at least partially purified solution;
    (d) oxygenating and agitating said at least partially purified solution while substantially avoiding application of shearing forces thereto; and
    (e) filtering the oxygenated solution to remove additional sludge therefrom to regenerate the used washing solution;
wherein the used solution is maintained at a substantially alkaline pH during said adding, separating, oxygenating and filtering steps by adjusting the quantity of said breaking and precipitating agent added thereto.

2. The method of claim 1 which further comprises adding to said filtered solution an amount of said organic tenside-containing detergent sufficient to compensate for losses thereof during the separation and filtration steps.

3. The method of claim 2 wherein the sludge is separated by gravity from said treated solution.

4. The method of claim 3 wherein the sludge is separated from the treated solution by passing said treated solution through a sludge/oil separator.

5. The method of claim 4 wherein said sludge/oil separator is further provided with a lamellae separator, through which said treated solution also passes.

6. The method of claim 1 wherein said at least partially purified solution is oxygenated and agitated by aeration.

7. The method of claim 1 which further comprises controlling the addition of said emulsion breaking and heavy metal precipitating agent by monitoring conductivity of the used washing solution.

8. The method of claim 4 wherein the oxygenated solution is filtered through a filter to remove additional sludge and the method further comprises back flushing the filter with filtered washing solution and returning the back flushed solution to the sludge/oil separator to remove a further amount of said sludge therefrom.

9. A process for regenerating a used washing solution for motorized vehicles, said process comprising:
    (a) generating a used washing solution comprising a detergent containing cationic tensides and a sludge comprising at least one of an oil, a heavy metal and particulate matter;
    (b) adding to said washing solution at least a sufficient quantity of a emulsion breaking and heavy metal precipitating agent to maintain the used washing solution at a substantially alkaline pH, thus forming a treated washing solution, said agent comprising a multivalently anionic soluble salt;
    (c) passing said treated washing solution through a sludge/oil separator to remove at least a portion of the sludge therefrom to form an at least partially purified solution;
    (d) aerating said at least partially purified solution while substantially avoiding application of substantial shearing forces thereto;
    (e) filtering the aerated solution through a filter to remove additional sludge therefrom; and
    (f) adding, to the filtered solution, an amount of organic tenside-containing detergent sufficient to compensate for losses thereof during the separation and filtration steps.

10. The method of claim 9 wherein said sludge/oil separator is further provided with a lamellae separator, through which said treated solution also passes.

11. The method of claim 9 which further comprises controlling the addition of said emulsion breaking and heavy metal precipitating agent with a conductivity meter in fluid communication with the used washing solution.

12. The method of claim 9 which further comprises back flushing the filter with filtered washing solution and returning the back flushed solution to the sludge/oil separator to remove a further amount of said sludge therefrom.

13. The method of claim 9 which further comprises continuously circulating water through said filter notwithstanding whether any used washing solution forms a portion of said circulating water.

14. A system for regenerating a used washing solution for motorized vehicles containing cationic tensides and sludge, said system comprising:
    (a) means for adding to said used washing solution, at least a quantity of an emulsion breaking and heavy metal precipitating agent to form a treated washing solution, said agent comprising a multivalently anionic salt, added in an amount to maintain the used solution at a substantially alkaline pH;
    (b) a gravity-based sludge/oil separator adapted for removal of at least a portion of the sludge from the treated solution to form an at least partially purified solution;
    (c) an aerated recycle tank adapted for oxygenating and agitating the at least partially purified solution without substantial application of shearing forces thereto; and
    (d) filtering means downstream from said tank for filtering the oxygenated and agitated solution to remove additional sludge therefrom.

15. The system of claim 14 which further comprises means for adding an additional amount of a detergent containing cationic tensides to the filtered washing solution to compensate for losses thereof which occur during removal of sludge therefrom.

16. The system of claim 14 which further comprises a lamellae separator operating in conjunction with said sludge/oil separator to remove additional sludge from the treated solution.

* * * * *